(12) United States Patent
Xiao

(10) Patent No.: US 12,482,885 B2
(45) Date of Patent: Nov. 25, 2025

(54) BATTERY CELL, BATTERY AND ELECTRICAL APPARATUS

(71) Applicant: CONTEMPORARY AMPEREX TECHNOLOGY (HONG KONG) LIMITED, Hong Kong (CN)

(72) Inventor: Jun Xiao, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 329 days.

(21) Appl. No.: 18/127,705

(22) Filed: Mar. 29, 2023

(65) Prior Publication Data

US 2023/0231241 A1    Jul. 20, 2023

Related U.S. Application Data

(63) Continuation of application No. PCT/CN2021/115166, filed on Aug. 27, 2021.

(51) Int. Cl.
*H01M 50/15* (2021.01)
*H01M 50/103* (2021.01)
*H01M 50/186* (2021.01)

(52) U.S. Cl.
CPC ......... *H01M 50/15* (2021.01); *H01M 50/103* (2021.01); *H01M 50/186* (2021.01)

(58) Field of Classification Search
CPC ... H01M 50/15; H01M 50/186; H01M 50/103
See application file for complete search history.

(56) References Cited

U.S. PATENT DOCUMENTS

2014/0205895 A1    7/2014    Kim et al.

FOREIGN PATENT DOCUMENTS

| CN | 207368121 U | 5/2018 |
|---|---|---|
| CN | 109904353 A | 6/2019 |
| CN | 213093269 U | 4/2021 |
| CN | 213278202 U | 5/2021 |
| EP | 2849247 A1 | 3/2015 |
| EP | 3171426 A1 | 5/2017 |
| JP | 2013033668 A | 2/2013 |
| JP | 2013-206884 A | 10/2013 |
| JP | 2014-197467 A | 10/2014 |
| JP | 2015-060759 A | 3/2015 |
| KR | 10-2018-0031444 A | 3/2018 |

(Continued)

OTHER PUBLICATIONS

Decision to Grant a Patent issued Jan. 7, 2025 in Japanese Patent Application No. 2023-521384 with machine English translation.

(Continued)

*Primary Examiner* — Jane J Rhee
(74) *Attorney, Agent, or Firm* — XSENSUS LLP

(57) ABSTRACT

A battery cell may include: a case, an outer surface thereof away from the interior of the battery cell may be clad with a first insulating layer; an end cap assembly, which may be disposed at an end portion of the case along the length direction of the battery cell; and an end cap patch, which may be attached to a surface of the end cap assembly away from the interior of the battery cell; wherein the end cap patch may be adhered with a second insulating layer, and the second insulating layer may be at least partially folded to the case and connected with the first insulating layer.

10 Claims, 9 Drawing Sheets

(56) References Cited

FOREIGN PATENT DOCUMENTS

| KR | 10-2249893 B1 | 5/2021 |
| WO | 2016103943 A1 | 6/2016 |
| WO | 2018056628 A1 | 3/2018 |

OTHER PUBLICATIONS

Office Action issued Jun. 10, 2024 in Japanese Patent Application No. 2023-521384 with English translation thereof.
Extended European Search Report issued Jul. 23, 2024 in European Patent Application No. 21954644.7.
International Search Report and Written Opinion mailed on May 13, 2022, received for PCT Application PCT/CN2021/115166, filed on Aug. 27, 2021, 12 pages including English Translation.
Office Action issued Mar. 24, 2025 in Korean Patent Application No. 10-2023-7010373 with English translation thereof.

BATTERY CELL, BATTERY AND ELECTRICAL APPARATUS

CROSS-REFERENCE TO RELATED APPLICATION

The present application is a continuation of International Application No. PCT/CN20211115166, filed Aug. 27, 2021, which is incorporated herein by reference in its entirety.

TECHNICAL FIELD

The present application relates to the technical field of energy storage devices, and in particular, to a battery cell, a battery, and an electrical apparatus.

BACKGROUND ART

Energy saving and emission reduction is the key to sustainable development of the automobile industry. In this case, electric vehicles have become an important part of the sustainable development of the automobile industry because of their advantages of energy saving and environmental protection. For electric vehicles, battery technology is an important factor related to their development. It is very important to protect the battery from short circuit during use and to improve the safety and reliability of the battery.

SUMMARY OF THE DISCLOSURE

In order to solve the above problems, the present application provides a battery cell, a battery and an electrical apparatus, which can reduce the risk of short circuit of the battery cell during use and improve the safety and reliability of the battery.

A first aspect of the embodiments of the present application provides a battery cell, including: a case, an outer surface thereof away from the interior of the battery cell is clad with a first insulating layer; an end cap assembly, which is disposed at an end portion of the case along the length direction of the battery cell; and an end cap patch, which is attached to a surface of the end cap assembly away from the interior of the battery cell; wherein the end cap patch is adhered with a second insulating layer, and the second insulating layer is at least partially folded to the case and is connected with the first insulating layer.

In the battery cell of the present application, before the end cap patch is attached to the end cap assembly, the second insulating layer is first adhered to the end cap patch, relying on the adhesiveness of the end cap patch and the second insulating layer, the two can be firmly adhered, so that the second insulating layer is folded to the case and then connected with the first insulating layer, so as to realize the cladding and insulation of the entire outer surface of the battery cell, so that the second insulating layer and the first insulating layer are completely adhered to the case, the adhesion is firm, and no warping occurs at the folded position, so as to prevent the end cap patch from falling off, and reduce the risk of short circuit of the battery.

In some embodiments, along the length direction of the battery cell, a distance of a predetermined length is reserved between an end portion of the first insulating layer close to the end cap assembly and an end portion of the case close to the end cap assembly, and the length of the second insulating layer folded to the case is greater than or equal to the predetermined length, so that the second insulating layer is connected with the first insulating layer.

When the length of the second insulating layer folded to the case is greater than the predetermined length, the second insulating layer is folded to the case and then covers a part of the first insulating layer, ensuring that the battery cell is completely clad with the insulating layer, thereby ensuring the overall insulating performance of the battery cell. When the length of the second insulating layer folded to the case is equal to the predetermined length, the second end portion of the second insulating layer is exactly aligned with the first end portion of the first insulating layer, so that there is no overlapping part between the second insulating layer and the first insulating layer, the overall thickness of the battery cell along the width direction of the battery cell and the thickness direction of the battery cell will not increase, and when a plurality of battery cells are stacked to form a battery module, the arrangement size of the battery module is not increased, and the energy density of the battery will not be affected.

In some embodiments, the length of the second insulating layer folded to the case is 10-20 mm, which not only can ensure that the second insulating layer is adhered firmly after folded to the case, but also can facilitate flattening.

In some embodiments, the case is a square case, the end cap assembly and the end cap patch are square structures adapted to the shape of the end portion of the case along the length direction of the battery cell, and the second insulating layer is provided with cutouts, and the cutouts extend from the diagonal vertices of the end cap patch to the end portion where the second insulating layer is folded to the case, so that the second insulating layer forms first folded portions located on both sides of the end cap patch along the thickness direction of the battery cell and second folded portions located on both sides of the end cap patch along the width direction of the battery cell.

The first folded portion and the second folded portion are respectively folded to the case, no wrinkles appear at the corner angle positions of the case, and a flat flanging is formed on the case, which improves the effect of insulation protection and does not affect energy density of the battery.

In some embodiments, the end cap patch is of a rectangular structure, the first folded portion is folded from the long side of the end cap patch to the case, and the second folded portion is folded from the short side of the end cap patch to the case, so as to facilitate the folding and flattening of the first folded portion and the second folded portion, and no wrinkles appear at the corner angle positions of the case, thereby improving the effect of insulation protection.

In some embodiments, in a state in which the second insulating layer is unfolded, the length of the first folded portion along the width direction of the battery cell is greater than the length of the long side, and the length of the second folded portion along the thickness direction of the battery cell is smaller than the length of the short side, so that the first folded portion is capable of being folded to the second folded portion after being folded to the case, thereby cladding a part of the second folded portion.

Setting the length of the first folded portion to be greater than the length of the long side, so that the first folded portion is capable of being folded to the second folded portion after being folded to the case, so as to clad the corner angle positions of the case, thereby completely cladding the case and improving the insulation performance of the case. In addition, when the first folded portion is folded to the second folded portion, the overall thickness of the battery cell along the thickness direction of the battery cell is not increased. When a plurality of battery cells are stacked and arranged along the thickness direction of the battery cells to form a battery module, the overall thickness of the battery module is not increased, so that the energy density of the battery module is not affected.

In some embodiments, in a state in which the second insulating layer is unfolded, the length of the first folded portion along the width direction of the battery cell is 10-20 mm greater than the length of the long side, and the length of the second folded portion along the thickness direction of the battery cell is 2-4 mm smaller than the length of the short side, so as to ensured that the first folded portion is capable of being folded to the second folded portion after being folded to the case, and dads a part of the second folded portion, thereby ensuring complete cladding of the case.

In some embodiments, in a state in which the second insulating layer is unfolded, the length of the first folded portion along the width direction of the battery cell is smaller than the length of the long side, and the length of the second folded portion in the thickness direction of the battery cell is greater than the length of the short side, so that the second folded portion is capable of being folded to the first folded portion after being folded to the case, thereby cladding a part of the first folded portion.

The second folded portion being folded to the first folded portion after folded to the case, so as to clad the corner angle positions of the case, thereby completely cladding the case and improving the insulation performance of the case. Furthermore, the second folded portion is folded to the first folded portion, and the overall width of the battery cell along the width direction of the battery cell is not increased. When a plurality of battery cells are stacked and arranged along the width direction of the battery cells to form a battery module, the overall width of the battery module is not increased, so that the energy density of the battery module is not affected.

In some embodiments, in a state in which the second insulating layer is unfolded, the length of the first folded portion along the width direction of the battery cell is 2-4 mm smaller than the length of the long side, and the length of the second folded portion along the thickness direction of the battery cell is 10-20 mm greater than the length of the short side, so as to ensured that the second folded portion is capable of being folded to the first folded portion after being folded to the case, and dads a part of the first folded portion, thereby ensuring complete cladding of the case.

In some embodiments, the second insulating layer is adhered to the edge region of the surface of the end cap patch away from the end cap assembly, so as to avoid interference with the terminal holes, so that the terminal holes are completely exposed, thereby not affecting the electrode terminals from penetrating out from the terminal holes.

In some embodiments, the width of the edge region where the second insulating layer is adhered to the end cap patch is 3-7 mm, which can ensure that the second insulating layer is firmly adhered to the end cap patch and avoid interference with the terminal holes.

In some embodiments, the end cap assembly is provided with a convex hull protruding away from the interior of the battery cell, and shoulders located on both sides of the convex hull along the width direction of the battery cell, and the end cap patch is provided with a convex portion adapted to the convex hull, and adhesion regions located on both sides of the convex portion along the width direction of the battery cell, and the adhesion region are adhered with a second insulating layer so that the second insulating layer covers the shoulders.

In order to improve the cooling effect of the cooling apparatus at the shoulder position, the size of the adhesion region of the end cap patch along the width direction of the battery cell is made small, not covering the shoulder position of the end cap assembly, and the shoulder is covered by the second insulating layer, so as to ensure the insulating effect of the shoulders. Since the second insulating layer has smaller thickness than the end cap patch, the cooling effect of the cooling apparatus at the shoulder position is enhanced.

In some embodiments, the width of the adhesion region is 3-7 mm, which enables the second insulating layer to be firmly adhered to the end cap patch, and enables the second insulating layer to cover a sufficient area of the shoulders, so that the cooling effect is enhanced when the shoulder position is cooled, thereby improving the safety performance of the battery cell.

A first aspect of the embodiments of the present application provides a battery, including a plurality of battery cells as described above. The battery cells have good overall insulation performance, the risk of short circuit is reduced, and the safety of the battery is improved.

A third aspect of the embodiments of the present application provides an electrical apparatus, including the battery described above, wherein the battery is used for providing electric energy, and has a high safety performance.

It should be understood that the above general description and the following detailed description are only exemplary and can not limit the present application.

DESCRIPTION OF DRAWINGS

In order to illustrate the technical solutions of the embodiments of the present application more clearly, the accompanying drawings required in the embodiments of the present application will be briefly introduced below. Obviously, the drawings described below are merely specific embodiments of the present application. A person skilled in the art may obtain other embodiments based on the following accompanying drawings without creative efforts.

Figure 1:
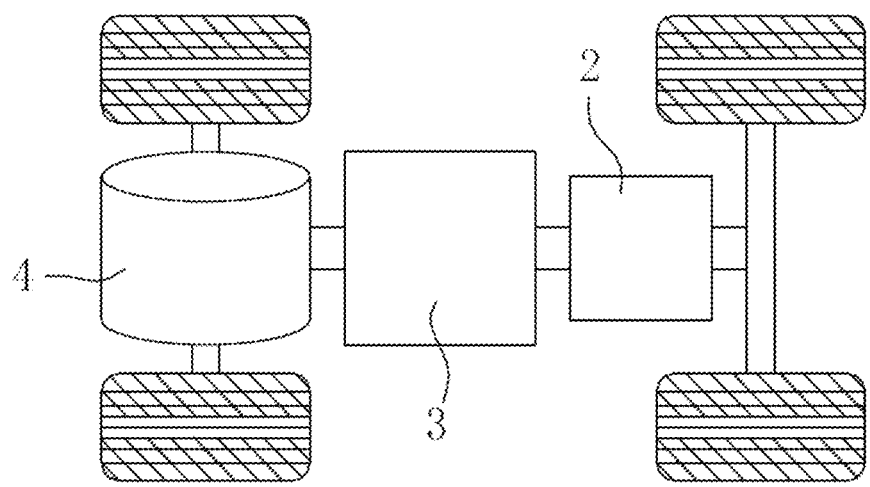
FIG. 1 is a schematic structural view of a vehicle provided by some embodiments of the present application.

DESCRIPTION OF REFERENCE NUMERALS 1-vehicle, 2-battery, 3-controller, 4-motor, 5-box body;
51-first box body portion, 52-second box body portion, 53-accommodating space; 20-battery cell; 200-battery module;
21-end cap assembly, 211-electrode terminal, 212-end cap, 213-convex hull; 214-shoulder; 22-electrode assembly, 221-tab;
23-case, 231-opening;
24-end cap patch, 241-terminal hole, 242-long side, 243-short side, 244-convex portion; 245-adhesion region;
25-first insulating layer, 251-first end portion;
26-second insulating layer, 261-first folded portion, 262-second folded portion, 263-second end portion, 264-cutout.

The accompanying drawings herein are incorporated in the specification and constitute a part of the specification, illustrate embodiments consistent with the present application, and together with the specification serve to explain the principles of the present application.

DETAILED DESCRIPTION

To better understand the technical solutions of the present application, embodiments of the present application are described in detail below with reference to the accompanying drawings.

It should be clear that the described embodiments are only a part of the embodiments of the present application, rather than all of the embodiments. Based on the embodiments in the present application, all other embodiments obtained by those of ordinary skill in the art without creative effort fall within the protection scope of the present application.

The terms used in the embodiments of the present application are only for the purpose of describing specific embodiments, but are not intended to limit the present application. As used in the embodiments of the present application and the appended claims, the singular forms "a", "said" and "the" are intended to include the plural forms as well, unless the context clearly indicates other meanings.

It should be understood that the term "and/or" used herein is only an association relationship for describing associated objects, indicating that three relationships may exist. For example, A and/or B may represent three situations: A exists alone, both A and B exist, and B exists alone. In addition, the character "/" herein generally means that the associated objects before and after it are in an "or" relationship.

It should be noted that the terms "upper", "lower", "left", and "right" described in the embodiments of the present application are described by using an angle shown in the accompanying drawings, and should not be understood as limiting the embodiments of the present application. In addition, in the context, it is also to be understood that when it is mentioned that an element is connected "on" or "under" another element, it can not only be directly connected "on" or "under" the other element, but also be indirectly connected "on" or "under" the other element by means of an intermediate element.

At present, from the perspective of the development of the market situation, power batteries are more and more widely used. The power batteries are used in energy storage power source systems such as hydraulic, thermal, wind and solar power stations as well as in electric vehicles such as electric bicycles, electric motorcycles and electric cars, and military equipment and aerospace fields. With the continuous expansion of the application field of the power batteries, the market demand is also constantly expanding.

In the field of electric carriers such as electric vehicles, the power battery, as the core component of the vehicle, is related to the safety of the vehicle, and the safety of the power battery has become one of the most important criteria for considering the performance of the power battery.

The battery mentioned in the embodiments of the present application refers to a single physical module including one or more battery cells to provide a higher voltage and capacity. For example, the battery mentioned in the present application may include a battery module, a battery pack, or the like. The battery typically includes a box body for encapsulating one or more battery cells. The box body can prevent liquids or other foreign matters from affecting charging or discharging of the battery cells.

At present, a battery cell generally includes a case, an electrode assembly, and an end cap assembly. The electrode assembly is electrically connected to the end cap assembly, and the end cap assembly covers an opening of the case. The case and the end cap assembly are usually fixed by using a welding connection to provide a sealed space for the electrode assembly and the electrolyte solution.

After the battery cell is assembled, a layer of insulating film is usually wrapped on the outer surface thereof, and on the one hand, the effect of insulation can be achieved, so as to prevent the metal case from being short circuited with external circuits, and on the other hand, the effect of protection can be achieved, so as to prevent the metal case from being worn and scratched. In addition, since the end cap assembly needs to lead out electrode terminals, the protective film cannot completely wrap the end cap assembly. Therefore, an end cap patch is usually adhered to the end cap assembly, and the function thereof is the same as that of the insulating film, both being for insulating and protecting. Since the end cap assembly is located at the end portion along the length direction of the battery cell, the end cap assembly is more susceptible to vibration shock than the case during the use of the battery, therefore, the end cap patch adhered to the end cap assembly generally has a thicker dimension and a higher wear strength than the insulating film.

When the end cap patch and the insulating film are mounted, the end cap patch is first adhered to a corresponding position of the end cap assembly, and then the insulating film is wrapped around the outer surface of the case. The width of the insulating film exceeds the end portion of the case along the length direction of the battery cell by a certain distance, after the insulating film is adhered to the outer surface of the case, the excess part is folded in the direction of the end cap patch and adhered to the end cap patch. In this way, the entire outer surface of the battery cell is wrapped to achieve overall insulation.

The applicant notes that during the process of folding the insulating film to the end cap patch and adhering it to the end cap patch, it is usually necessary to reserve a wide dimension at the edge of the end cap patch, so that sufficient space can be left to enable the insulating film to be folded and adhered to the end cap patch. However, for the end cap assembly with small size, since electrode terminals are provided thereon, the space reserved for folding the insulating film on the edge of the end cap patch is very small; likewise, for the end cap assembly provided with a convex hull structure, usually the width of the periphery of the convex hull of the end cap assembly is also small, which also makes the space reserved for folding insulating film is very small. For this type of end cap patch with narrow edges, when the insulating film is folded and pressed down towards the end cap patch, due to the interference of the electrode terminals or the convex hull structure, the pressing space is insufficient, and the flanging is not easy to be flattened, and warping easily occurs.

In order to solve the above-mentioned problems, the applicant improves the structure of the battery cell, provides an insulating layer on the end cap patch, so that the insulating layer is folded toward the case and connected with the insulating film adhered on the case, thereby avoiding the problem that the insulating film is not easy to be flattened when it is folded to the end cover patch and warping easily occurs. In this way, the overall insulation of the battery cell is realized. The following further describes the embodiments of the present application.

The battery cell described in the embodiments of the present application is suitable for batteries and apparatus using batteries.

The apparatus using batteries may be, but not limited to, a vehicle, a mobile phone, a portable device, a laptop computer, a ship, a spacecraft, an electric toy, an electric tool, and the like. The vehicle may be a fuel vehicle, a gas vehicle or a new energy vehicle. The new energy vehicle may be an all-electric vehicle, a hybrid electric vehicle, an extended-range electric vehicle, or the like. The spacecraft includes airplanes, rockets, space shuttles, spaceships, and the like. The electric toy includes fixed or mobile electric toys, such as game consoles, electric car toys, electric ship toys and electric aircraft toys. The electric tool includes metal cutting electric tools, grinding electric tools, assembly electric tools and railway electric tools, such as electric drills, electric grinders, electric wrenches, electric screwdrivers, electric hammers, impact drills, concrete vibrators and electric planers. The apparatus using batteries is not specially limited in the embodiments of the present application.

In the following embodiments, for the convenience of description, the apparatus using batteries is a vehicle.

FIG. 1 is a schematic structural view of a vehicle 1 provided by some embodiments of the present application.

As shown in FIG. 1, a battery 2 is disposed inside the vehicle 1, the battery 2 refers to a single physical module that includes one or more battery cells to provide higher voltage and capacity, for example, the battery 2 mentioned in the present application may include a battery module, a battery pack, or the like. The battery 2 may be provided at the bottom or head or rear of the vehicle 1. The battery 2 may be used for power the vehicle 1, for example, the battery 2 may be used as an operating power source of the vehicle 1. The vehicle 1 may further include a controller 3 and a motor 4, wherein the controller 3 is used for controlling the battery 2 to power the motor 4, for example, for the operating power demand when the vehicle 1 is starting, navigating and driving.

In some embodiments of the present application, the battery 2 may not only be used as the operating power source of the vehicle 1, but also be used as a driving power source of the vehicle 1 to replace or partially replace fuel or natural gas to provide driving power for the vehicle 1.

Figure 2:
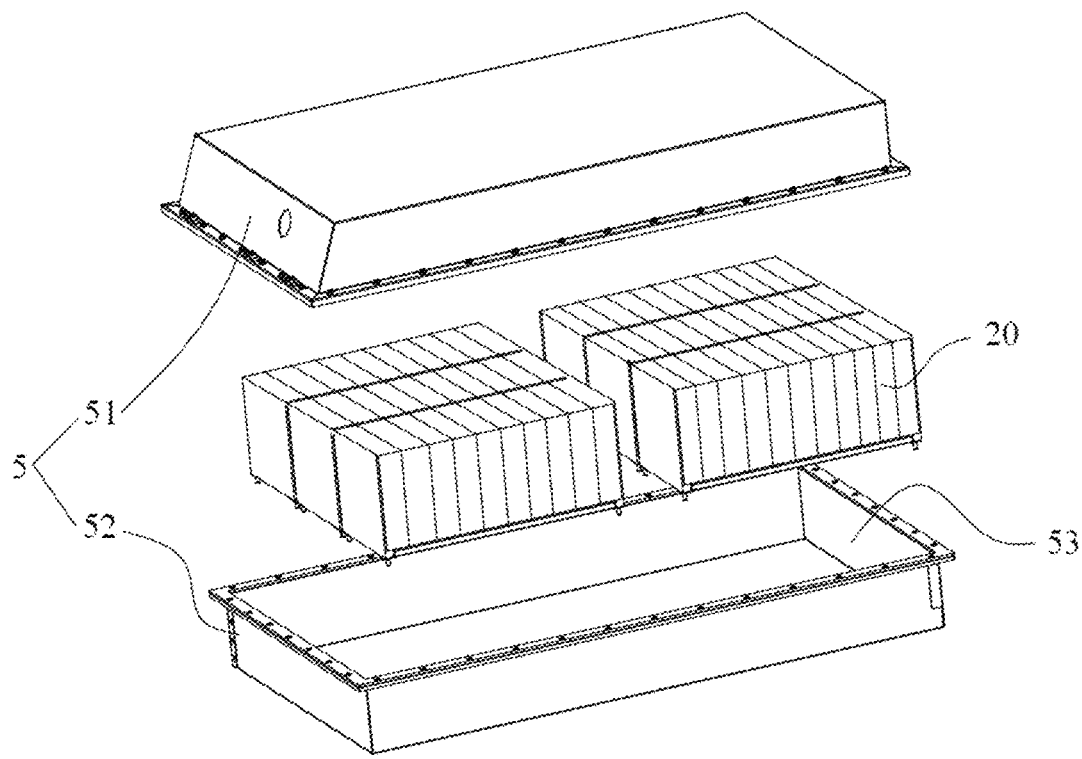
FIG. 2 is a schematic exploded view of a battery according to some embodiments of the present application.

FIG. 2 is a schematic exploded view of a battery 2 according to some embodiments of the present application.

As shown in FIG. 2, the battery 2 comprises a box body 5 and battery cells 20, and the battery cells 20 are accommodated in the box body 5.

The box body 5 is used for accommodating the battery cells 20, and the box body 5 may be in various structures. In some embodiments, the box body 5 may include a first box body portion 51 and a second box body portion 52, the first box body portion 51 and the second box body portion 52 are covered with each other, and the first box body portion 51 and the second box body portion 52 together define an accommodating space 53 for accommodating the battery cells 21. The second box body portion 52 may be of a hollow structure with one end opening, the first box body portion 51 may be of a plate-shaped structure, and the first box body portion 51 covers the opening side of the second box body portion 52 to form a box body 5 having an accommodating space 53; both of the first box body portion 51 and the second box body portion 52 may also be of hollow structures with one side openings, and the opening side of the first box body portion 51 covers the opening side of the second box body portion 52 to form the box body 5 having the accommodating space 53. Certainly, the first box body portion 51 and the second box body portion 52 may be of various shapes, such as cylinder, cuboid, etc.

In order to improve the airtightness after connecting the first box body portion 51 with the second box body portion 52, a sealing member such as a sealant, a sealing ring, or the like may be provided between the first box body portion 51 and the second box body portion 52.

It is assumed that the first box body portion 51 covers the top of the second box body portion 52, the first box body portion 51 may also be referred to as an upper box cover, and the second box body portion 52 may also be referred to as a lower box body.

In the battery 2, there are a plurality of battery cells 20. The plurality of battery cells 20 can be connected in series or parallel or in parallel-series connection, wherein the parallel-series connection means that the plurality of battery cells 20 are connected in both series and parallel. The plurality of battery cells 20 can be directly connected in series or parallel or in parallel-series connection together, and then the whole of the plurality of battery cells 20 is accommodated within the box body 5; of course, the plurality of battery cells 20 may first connected in series or parallel or in parallel-series connection to form a battery group, and then a plurality of battery groups are connected in series or parallel or in parallel-series connection to form a whole and is accommodated within the box body 5.

According to different power requirements, the number of battery cells 20 may be set to any value. The plurality of battery cells 20 may be connected in series, in parallel or be in parallel-series connection to achieve large capacity or power. The plurality of battery cells 20 may alternatively be connected in series or in parallel or in mixed connection to form a battery module, and then a plurality of battery modules are connected in series or in parallel or in parallel-series connection to form the battery 2. That is to say, the plurality of battery cells 20 may directly form the battery 2, or may form battery modules first, and then the battery modules form the battery 2, and is accommodated in the box body 5.

Figure 3:
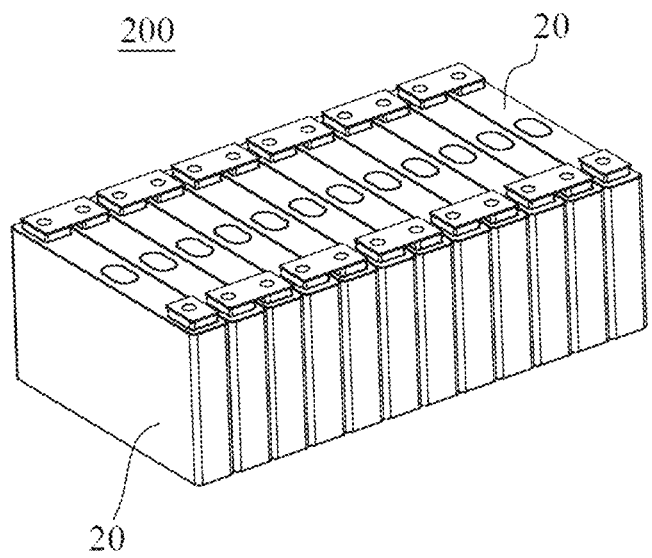
FIG. 3 is a schematic structural diagram of a battery module according to an embodiment of the present application.

FIG. 3 is a schematic structural view of a battery module 200 according to an embodiment of the present application.

As shown in FIG. 3, since each battery 2 may include a large number of battery cells 20, for ease of installation, the battery cells 20 may be arranged in groups, and each group of battery cells 20 constitutes a battery module 200. The battery 2 may include a plurality of battery modules 200, and the battery modules 200 may be connected in series, parallel or in parallel-series connection.

Figure 4:
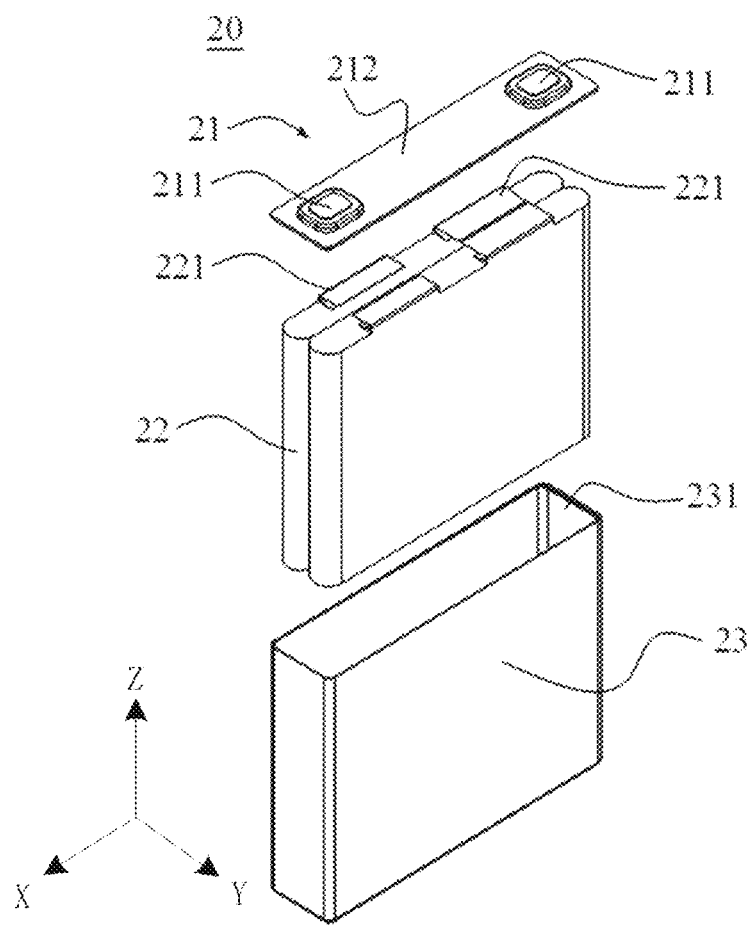
FIG. 4 is a schematic exploded view of a battery cell according to some embodiments of the present application.

FIG. 4 is a schematic exploded view of a battery cell 20 according to some embodiments of the present application.

Referring to FIG. 4, a battery cell 20 is a minimum constituent unit to form the battery 2. In some embodiments of the present application, the battery cell 20 may include a lithium-ion secondary battery cell, a lithium-ion primary battery cell, a lithium-sulfur battery cell, a sodium/lithium ion battery cell, a sodium-ion battery cell, a magnesium-ion battery cell, or the like. This is not limited in this embodiment of the present application. The battery cell 20 may be a cylinder, a flat body, a rectangular parallelepiped, or in other shapes, which is also not limited in the embodiments of the present application. For ease of description, the battery cell 20 in a rectangular parallelepiped shape is used as an embodiment in the following embodiments.

Please continue to refer to FIG. 4, the battery cell 20 includes an end cap assembly 21, an electrode assembly 22, and a case 23. The case 23 is used for accommodating the electrode assembly 22 in the case 23. The case 23 may be of various shapes and sizes, specifically, the shape of the case 23 may be determined according to the specific shape and size of one or more electrode assemblies 22. In some embodiments, the case 23 is a hollow cuboid. In other embodiments, the case 23 may be cylindrical or other shapes. One end of the case 23 is an opening 231, and the end cap assembly 21 covers the opening 231 and is connected with the case 23 to form a closed cavity for placing the electrode assembly 22. The cavity may be filled with electrolyte solution. In some embodiments, the end cap assembly 21 includes an end cap 212, the end cap 212 is provided with electrode terminals 211, the electrode assembly 22 is provided with tabs 221, and the electrode terminals 211 can be used to electrically connected with the tabs 221 for outputting electric energy of the battery cell 20. Each electrode terminal 211 may be provided with a current collecting member correspondingly, and the current collecting member may be located between the end cap 212 and the tab 221, so that the electrode terminal 211 and the tab 221 may be electrically connected through the current collecting member. The end cap assembly 21 may also be provided with other functional components, for example, a pressure relief mechanism for releasing the internal pressure when the internal pressure or temperature of the battery cell 20 reaches a threshold. The case 23 and the end cap 212 may be made of various materials, such as copper, iron, aluminum, stainless steel, aluminum alloy, or the like.

After the end cap assembly 21, the electrode assembly 22 and the case 23 of the battery cell 20 are assembled and the electrolyte solution is injected, the case 23 and the end cap 212 need to be clad and insulated to prevent the risk of short circuit of the battery cell 20. Generally, an end cap patch 24 (see FIG. 5) is arranged on the end cap 212 for insulation and protection of the end cap 212, the case 23 is clad with an insulating layer, and the length of the insulating layer along the length direction Z of the battery cell is greater than the length of the case 23 along the length direction Z of the battery cell, so that the insulating layer can be folded to the end cap patch 24 and adhered to the end cap patch 24, and fix the end cap patch 24, so as to achieve overall insulation of the battery cell 20. However, for a battery cell 20 with a small overall size, since the electrode terminals 211 are provided on the end cap assembly 21, the width of the end cap 212 on both sides of the electrode terminals 211 along the thickness direction Y of the battery cell is small, as a result, the region where the end cap patch 24 can be adhered with the insulating layer on both sides of the electrode terminal 211 along the thickness direction Y of the battery cell is very small. If the width of the region along the thickness direction Y of the battery cell is less than 7 mm, when the insulating layer is folded to the direction of the end cap patch 24, the flattening apparatus of the insulating layer cannot flatten and press the insulating layer within the range of 7 mm, which causes the insulating layer on the end cap patch 24 to be easily warped, so that the end cap patch 24 is easy to fall off. The insulation performance of the battery cell 20 is reduced, resulting in the risk of short circuit.

Figure 5:
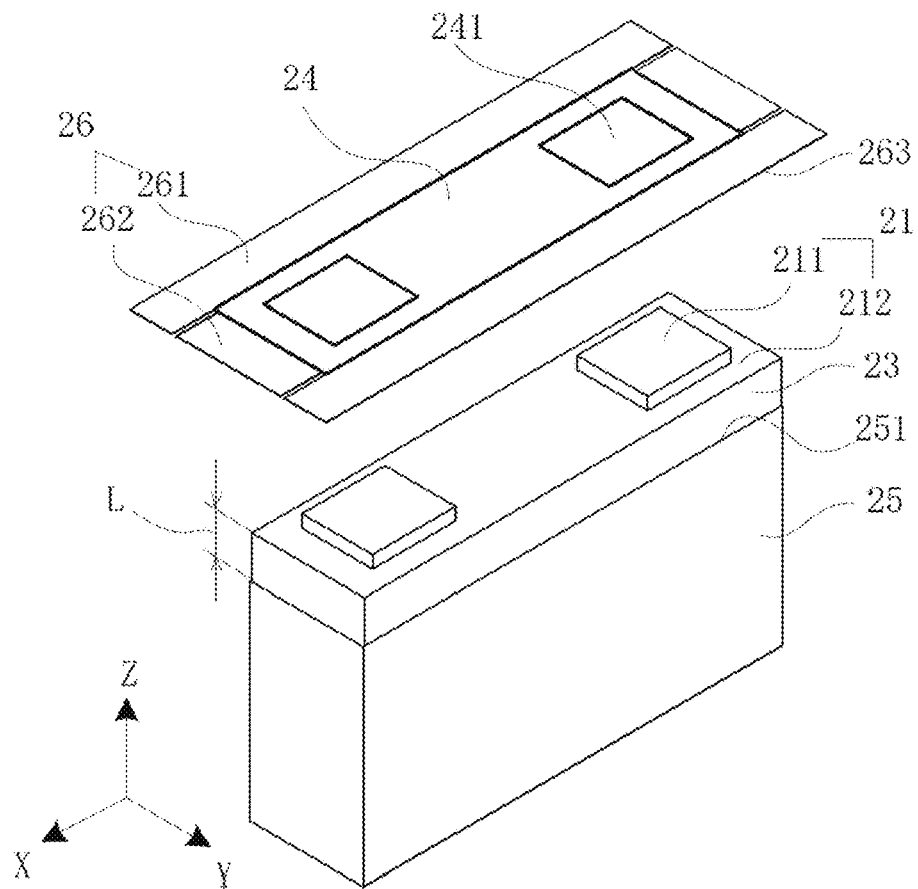
FIG. 5 is a schematic exploded view of a battery cell cladding with an insulating layer according to some embodiments of the present application.
Figure 6:
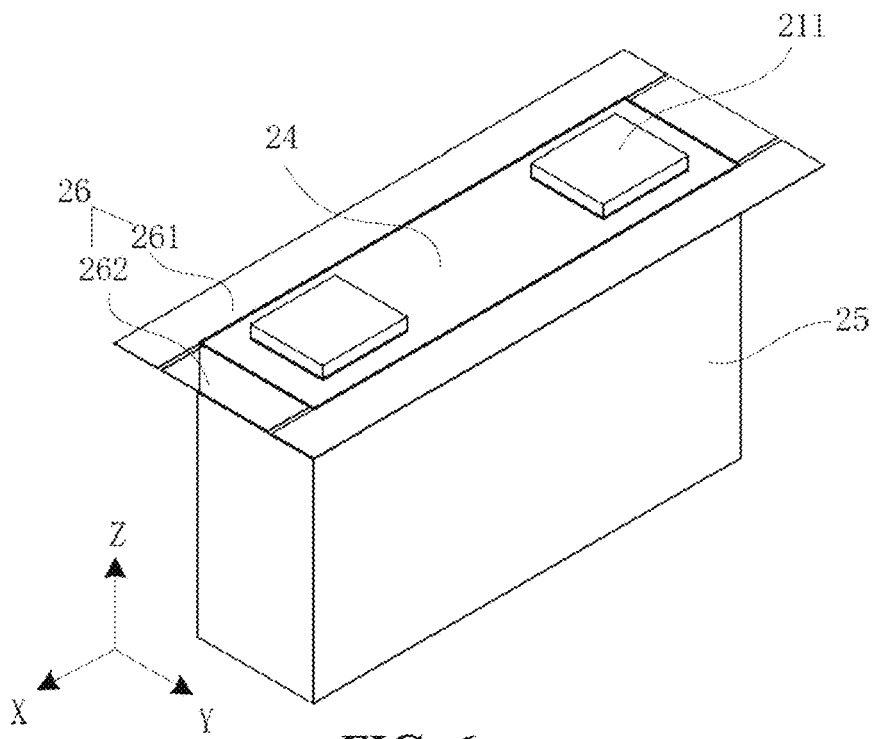
FIG. 6 is a schematic view of the end cap patch of the battery cell in FIG. 5 adhered to the end cap assembly.
Figure 7:
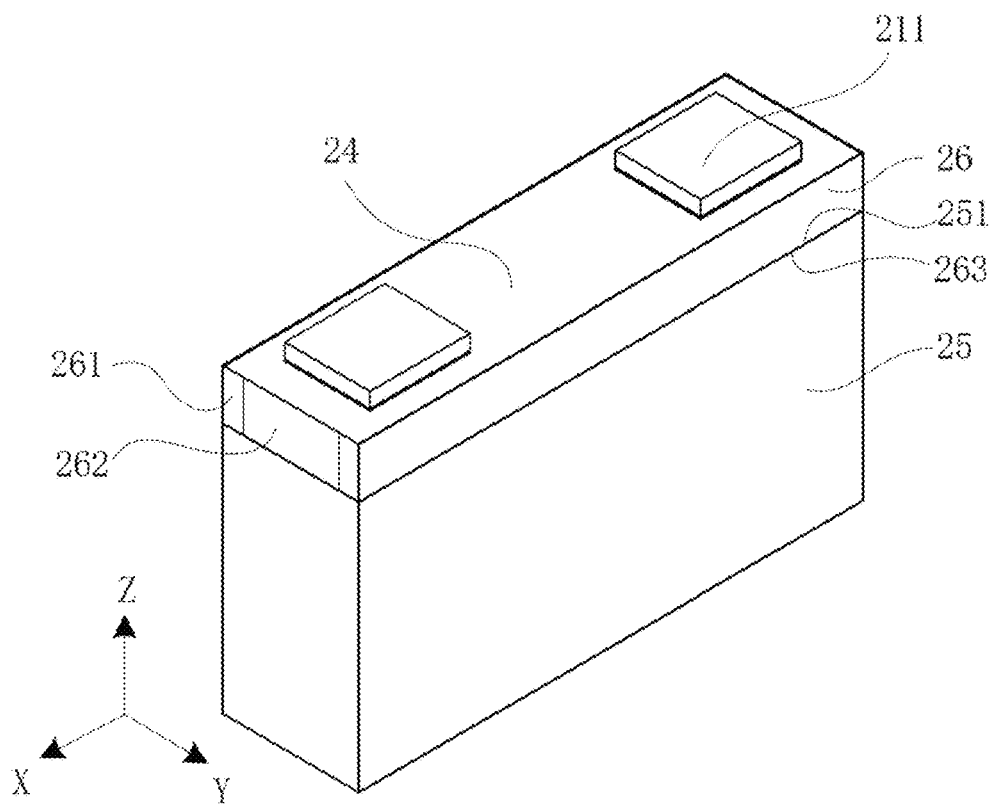
FIG. 7 is a schematic view of the battery cell in FIG. 6 has been clad with an insulating layer.

FIG. 5 is a schematic exploded view of a battery cell 20 cladding with an insulating layer according to some embodiments of the present application; FIG. 6 is a schematic view of the end cap patch 24 of the battery cell 20 in FIG. 5 adhered to the end cap assembly 21; FIG. 7 is a schematic view of the battery cell 20 in FIG. 6 has been clad with an insulating layer;

As shown in FIGS. 5 to 7, the battery cell 20 provided in some embodiments of the present application includes a case 23, an end cap assembly 21, and an end cap patch 24. The end cap assembly 21 is disposed at an end portion of the case 23 along the length direction Z of the battery cell 20, and after the end cap assembly 21 is fixedly connected to the case 23, an insulating layer needs to be clad on the outer surface of the case 23 away from the interior of the battery cell 20, so as to protect the outer surface of the case 23, thereby achieving insulation of the case 23. In this embodiment, the outer surface of the case 23 away from the interior of the battery cell 20 is clad with a first insulating layer 25; the end cap patch 24 is attached to the surface of the end cap 212 away from the interior of the battery cell 20; wherein the end cap patch 24 is adhered with a second insulating layer 26, and the second insulating layer 26 is at least partially folded to the case 23 and is connected with the first insulating layer 25.

The "clad" mentioned in the present application means that the insulating layer covers the outer surface of the case 23, and the way of cladding may be by gluing, or pasting to the outer surface of the case 23 through the adhesiveness of the insulating layer material itself; the "attach" as described in the present application may be fixed connection, detachable connection, or integrated connection. For example, if the end cap patch 24 is attached to the surface of the end cap assembly 21 away from the interior of the battery cell 20, the end cap patch 24 may be adhered to the surface of the end cap assembly 21 away from the interior of the battery cell 20 by means of gluing, or adhered to the surface of the end cap assembly 21 away from the interior of the battery cell 20 by using the adhesiveness of the material of the end cap patch 24 itself, or the surface of the end cap patch 24 facing the end cap assembly 21 is only in contact with the surface of the end cap assembly 21 away from the interior of the battery cell 20.

As shown in FIG. 5, the first insulating layer 25 clads the outer surface of the case 23 away from the interior of the battery cell 20 and the bottom of the battery cell 20. Alternatively, the bottom of the battery cell 20 is provided with other insulating members, and the first insulating layer 25 is folded to the bottom and dads other insulating members at the bottom, so as to achieve the purpose of overall insulation. The first insulating layer 25 may clad the entire outer surface of the case 23, or may only clad a part of the outer surface of the case 23, so that in the length direction Z of the battery cell, a distance of a predetermined length is reserved between the first end portion 251 of the first insulating layer 25 close to the end cap assembly 21 and the end portion of the case 23 close to the end cap assembly 21.

In this embodiment, the end cap assembly 21 includes an end cap 212 and electrode terminals 211 disposed on the end cap 212. In order to expose the electrode terminals 211 for electrical connection with external circuits, terminal holes 241 are provided at the position of the end cap patch 24 corresponding to the electrode terminals 211, a second insulating layer 26 is adhered to the outer peripheral edge region of the end cap patch 24 which avoids the terminal holes 241, and the second insulating layer 26 can be adhered to the outer peripheral edge region of the end cap patch 24 by means of adhesive, and can also be bonded together by the adhesiveness of the material of the end cap patch 24 and the second insulating layer 26.

In some specific embodiments, the end cap patch 24 is made of polycarbonate (PC), the first insulating layer 25 and the second insulating layer 26 are made of polyethylene terephthalate (PET), PC material and PET material have good mechanical properties and wear resistance, and can protect and insulate the battery cells 20 well.

As shown in FIGS. 6 and 7, when the end cap patch 24 is attached to the end cap assembly 21, the terminal holes 241 are corresponded to the electrode terminals 211, so that the electrode terminals 211 penetrates out from the terminal holes 241 and exposed, and then the other portion of the end cap patch 24 are closely adhered to the end cap assembly 21, after the end cap patch 24 is attached to the surface of the end cap assembly 21 away from the interior of the battery cell 20, the second insulating layer 26 of the end cap patch 24 avoids the outer peripheral edge region of the terminal holes 241 at least partially folded to the case 23 and connected with the first insulating layer 25. In this embodiment, the end cap patch 24 is adapted to the shape and size of the surface of the end cap assembly 21 away from the interior of the battery cell 20, and the second insulating layer 26 is adhered to the outer peripheral edge region of the end cap patch 24, in this way, the portion of the second insulating layer 26 extending to the outside of the end cap assembly 21 can be folded to the case 23, and the folded portion is adhered to the case 23 and connected with the first insulating layer 25. The second insulating layer 26 being connected with the first insulating layer 25, it can be the second insulating layer 26 covering a part of the first insulating layer 25 along the length direction Z of the battery cell, or the end portion of the second insulating layer 26 being exactly aligned with the end portion of the first insulating layer 25 facing the end cap assembly 21, so as to realize the cladding and insulation of the entire outer surface of the battery cell 20.

In the battery cell 20 of this embodiment, before the end cap patch 24 is adhered to the end cap assembly 21, the second insulating layer 26 is first adhered to the end cap patch 24, avoiding the positions of the terminal holes 241, relying on the adhesiveness of the end cap patch 24 and the second insulating layer 26 themselves, the two can be firmly adhered. After the end cap patch 24 is attached to the end cap assembly 21, the part of the second insulating layer 26 exceeding the end cap patch 24 and the end cap assembly 21 is folded to the case 23, since the outer surface of the case 23 is a flat and smooth plane, there is no interference from other elements, so that the second insulating layer 26 is connected with the first insulating layer 25 after folded to the case 23, thereby achieving cladding and insulation of the entire outer surface of the battery cell 20, so that the second insulating layer 26 and the first insulating layer 25 are completely adhered to the case 23, the adhesion is firm, and no warping occurs at the folded position, so that the end cap patch 24 is prevented from falling off, thereby reducing the risk of short circuit of the battery cell 20.

Please continue to refer to FIG. 5, in some embodiments, along the length direction Z of the battery cell, a predetermined length L is reserved between the first end portion 251 of the first insulating layer 25 close to the end cap assembly 21 and the end portion of the case 23 close to the end cap assembly 21, and the length of the second insulating layer 26 folded to the case 23 is greater than or equal to the predetermined length L, so that the second insulating layer 26 is connected with the first insulating layer 25.

When the length of the second insulating layer 26 folded to the case 23 is greater than the predetermined length L, the second insulating layer 26 is folded to the case 23 and then covers a part of the first insulating layer 25, so as to ensure that the battery cell 20 is completely clad with the insulating layer, thereby ensuring the overall insulation performance of the battery cell 20.

Please continue to refer to FIG. 7, when the length of the second insulating layer 26 folded to the case 23 is equal to the predetermined length L, after the second insulating layer 26 is folded to the case 23, the second end portion 263 of the second insulating layer 26 extending outward from the end cap patch 24 is exactly aligned with the first end portion 251 of the first insulating layer 25, so as to completely clad the battery cell 20. In this embodiment, the second end portion 263 of the second insulating layer 26 is exactly aligned with the first end portion 251 of the first insulating layer 25, so there is no overlap part between the second insulating layer 26 and the first insulating layer 25, so that the overall thickness of the battery cell 20 along the width direction X of the battery cell and the thickness direction Y of the battery cell does not increase, and when a plurality of battery cells 20 are stacked to form a battery module 200, the arrangement size of the battery module 200 is not increased, and the energy density of the battery 2 is not affected.

In some embodiments, the length of the second insulating layer 26 folded to the case 23 is 10-20 mm. If the folded length of the second insulating layer 26 is set too long, when the second insulating layer 26 is folded, the excessively long length makes the second insulating layer 26 difficult to be flattened, easy to foam, and affects the adhesion effect. When the folded length of the second insulating layer 26 is set to be too short, the adhesion at the folded position is not firm, and warping easily occurs. The length of the second insulating layer 26 folded to the case 23 is 10-20 mm, which not only can ensure that the second insulating layer 26 is adhered firmly after folded to the case 23, but also can facilitate flattening.

Figure 8:
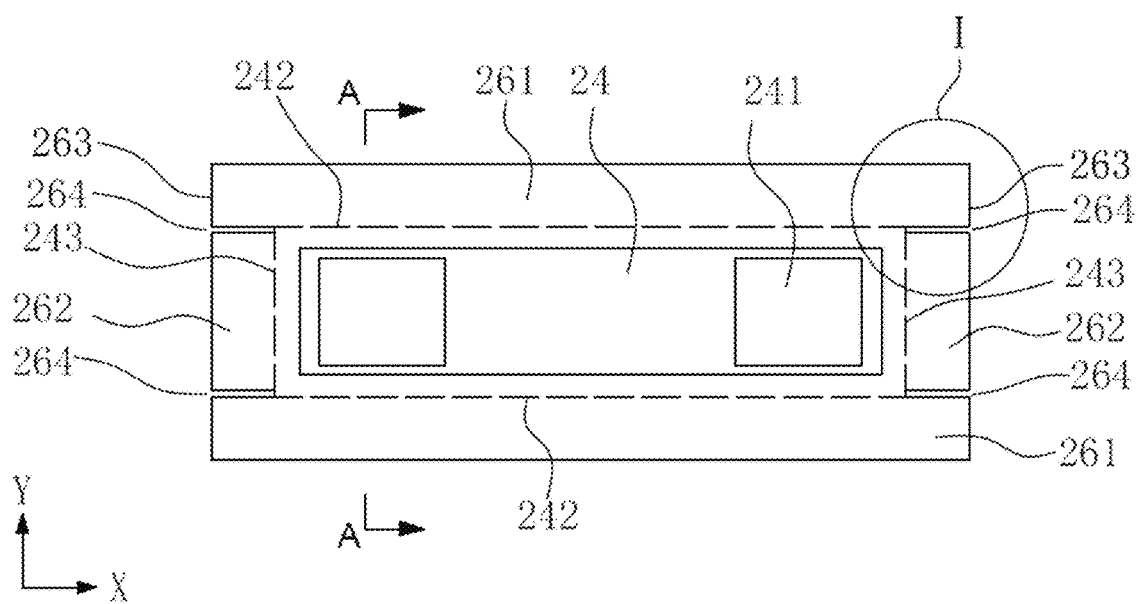
FIG. 8 is a top view of an end cap patch adhered with a second insulating layer according to some embodiments of the present application.

FIG. 8 is a top view of an end cap patch 24 adhered with a second insulating layer 26 according to some embodiments of the present application.

Referring to FIGS. 5 to 8, in some embodiments, the case 23 is a square case, the end cap assembly 21 and the end cap patch 24 are square structures adapted to the shape of the end portion of the case 23 along the length direction Z of the battery cell.

As shown in FIG. 8, the second insulating layer 26 is provided with cutouts 264, the cutouts 264 extend from the diagonal vertices of the end cap patch 24 to second end portions 263 of the second insulating layer 26 folded to the case 23, so that the second insulating layer 26 forms first folded portions 261 located on both sides of the end cap patch 24 along the thickness direction Y of the battery cell and second folded portions 262 located on both sides of the end cap patch 24 along the width direction X of the battery cell.

On the second insulating layer 26, cutouts 264 are respectively provided at four vertices of the diagonal lines of the end cap patch 24 to form the first folded portions 261 and the second folded portions 262, the first folded portions 261 and the second folded portions 262 are respectively folded to the case 23, no wrinkles appear at the corner positions of the case 23, and a flat flanging is formed on the case 23, which improves the effect of insulation protection and does not affect energy density of the battery.

In some embodiments, the end cap patch 24 is of a rectangular structure (the rectangular structure enclosed by the dotted line in FIG. 8 is the edge position of the end cap patch 24), and the first folded portions 261 are folded from the long sides 242 of the end cap patch 24 to the case 23, and the second folded portions 262 are folded from the short sides 243 of the end cap patch 24 to the case 23, so as to facilitate the folding and flattening of the first folded portions 261 and the second folded portions 262, and no wrinkles appear at the corner positions of the case 23, thereby improving the effect of insulation protection.

Figure 9:
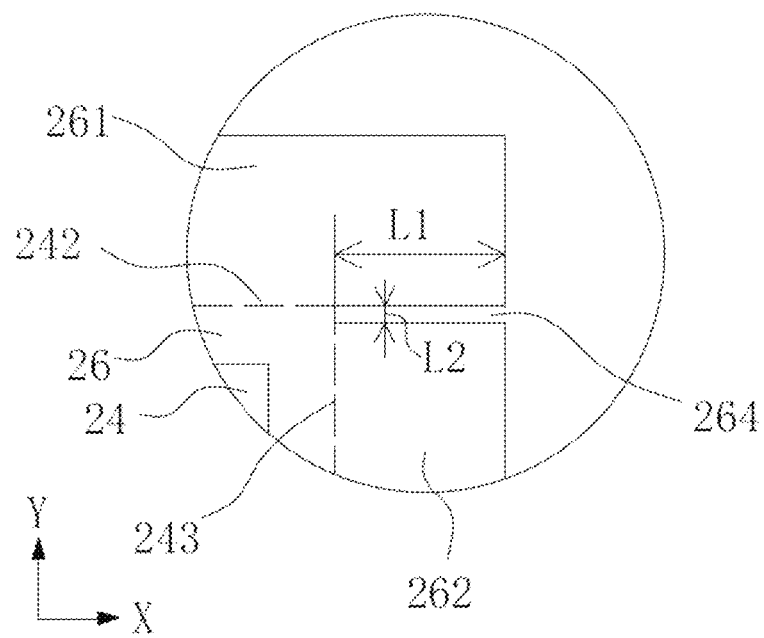
FIG. 9 is an enlarged view of part I in FIG. 8.

FIG. 9 is an enlarged view of part I in FIG. 8.

As shown in FIG. 7 to FIG. 9, in some embodiments, in a state in which the second insulating layer 26 is unfolded, the length of the first folded portions 261 along the width direction X of the battery cell is greater than the length of the long sides 242, and the length of the second folded portions 262 along the thickness direction Y of the battery cell is smaller than the length of the short sides 243, so that the first folded portions 261 can be folded to the second folded portions 262 after being folded to the case 23, thereby cladding a part of the second folded portions 262. Since the cutouts 264 are respectively provided at the four vertices of the diagonal lines of the end cap patch 24 to avoid wrinkles at the corner positions of the case 23 after the second insulating layer 26 is folded, after the first folded portions 261 and the second folded portions 262 being folded to the case 23 respectively, the corner positions of the case 23 is not clad, setting the length of the first folded portions 261 to be greater than the length of the long sides 242, so that the first folded portions 261 can be folded to the second folded portions 262 after being folded to the case 23, so as to clad the corner positions of the case 23, and achieve completely cladding the case 23, thereby improving the insulation performance of the case 23. Furthermore, the first folded portion 261 being folded to the second folded portion 262, the overall thickness of the battery cell 20 along the thickness direction Y of the battery cell is not increased, when a plurality of battery cells 20 are stacked and arranged along the thickness direction Y of the battery cell to form a battery module 200, the overall thickness of the battery module 200 is not increased, so that the energy density of the battery module 200 is not affected.

As shown in FIG. 9, in some embodiments, along the width direction X of the battery cell, the length of the first folded portion 261 respectively exceeds the long side 242 on both sides of the end cap patch 24 is the first length L1; along the thickness direction Y of the battery cell, the length of the second folded portion 262 respectively shorter than the short side 243 on both sides of the end cap patch 24 is the second length L2. After the second folded portions 262 being folded from the short sides 243 to the case 23, along the thickness direction Y of the battery cell, at both ends of the side surface of the short side 243 side of the case 23, there are gaps of the second length L2 with no insulating layer adhered, so that the parts with the first length L1 that the first folded portions 261 exceed the long sides 242 are folded in the direction of the second folded portions 262, so that the parts with the first length L1 clad the gaps with the second length L2 where no insulating layer is adhered, and clad parts of the second folded portions 262. Specifically, the first length L1 should be greater than or equal to the second length L2.

In some embodiments, in a state in which the second insulating layer 26 is unfolded, the length of the first folded portion 261 along the width direction X of the battery cell is 10-20 mm greater than the length of the long side 242, that is, the range of 2×L1 satisfies 10-20 mm; the length of the second folded portion 262 along the thickness direction Y of the battery cell is 2-4 mm smaller than the length of the short side 243, that is, the range of 2×L2 satisfies 2-4 mm, so that it can be ensured that the first folded portion 261 can be folded to the second folded portion 262 after being folded to the case 23, and dads a part of the second folded portion 262, thereby ensuring complete cladding of the case 23.

Figure 10:
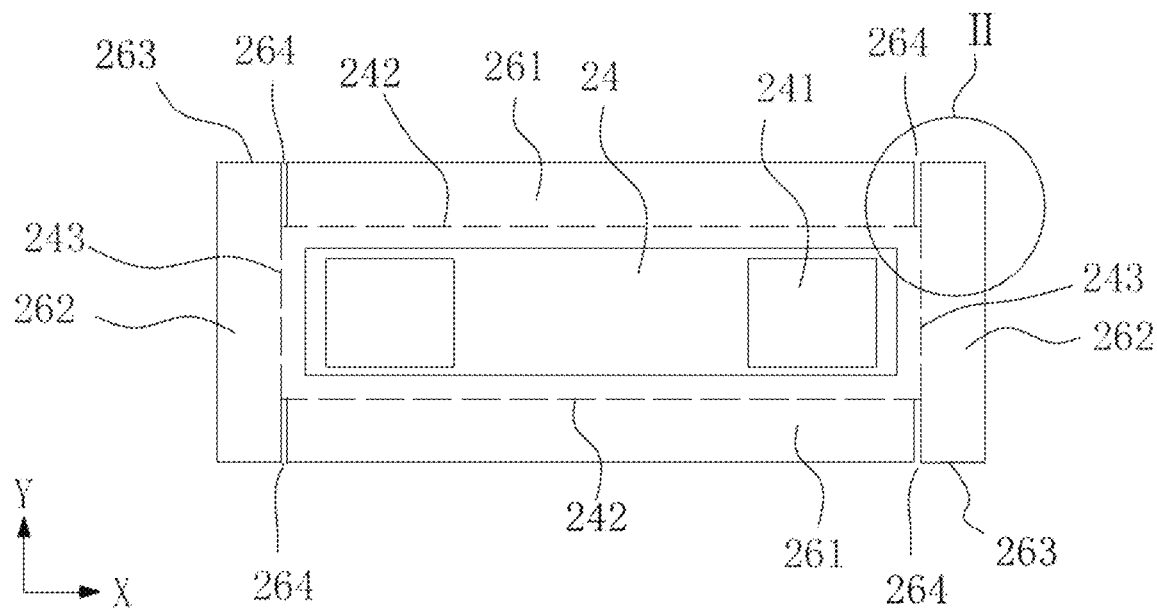
FIG. 10 is a top view of an end cover patch adhered with a second insulating layer according to some other embodiments of the present application.
Figure 11:
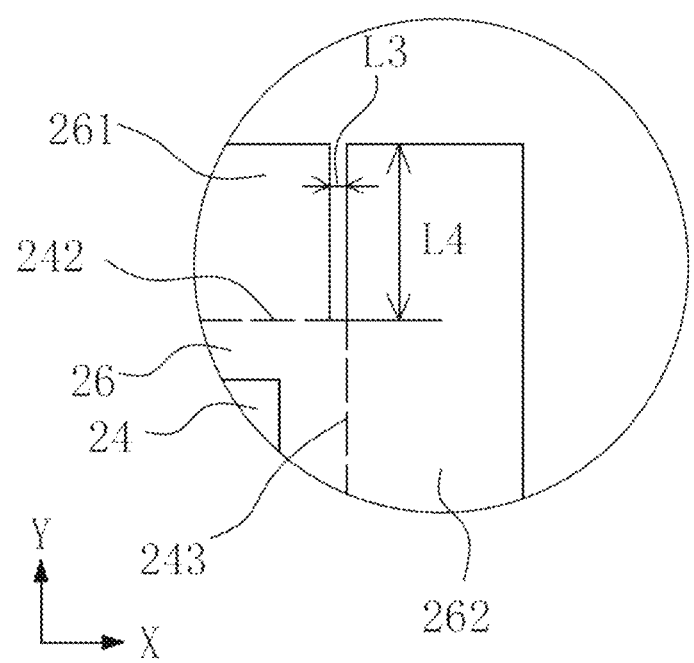
FIG. 11 is an enlarged view of part II in FIG. 10.

FIG. 10 is a top view of an end cover patch 24 adhered with a second insulating layer 26 according to some other embodiments of the present application. FIG. 11 is an enlarged view of part II in FIG. 10.

In some embodiments, in a state in which the second insulating layer 26 is unfolded, the length of the first folded portion 261 along the width direction X of the battery cell is smaller than the length of the long side 242, and the length of the second folded portion 262 along the thickness direction Y of the battery cell is greater than the length of the short side 243, so that the second folded portion 262 can be folded to the first folded portion 261 after being folded to the case 23, thereby cladding a part of the first folded portion 261. Since the cutouts 264 are respectively provided at the four vertices of the diagonal lines of the end cap patch 24 to avoid wrinkles at the corner positions of the case 23 after the second insulating layer 26 is folded, after the first folded portion 261 and the second folded portion 262 being folded to the case 23 respectively, the corner angle positions of the case 23 are not clad, setting the length of the second folded portion 262 to be greater than the length of the short side 243, so that the second folded portion 262 can be folded to the first folded portion 261 after being folded to the case 23, so as to clad the corner angle positions of the case 23, and completely clad the case 23, thereby improving the insulation performance of the case 23. Furthermore, the second folded portion 262 being folded to the first folded portion 261, the overall width of the battery cell 20 in the width direction X of the battery cell is not increased, and when a plurality of battery cells 20 are stacked and arranged in the width direction X of the battery cell to form a battery module 200, the overall width of the battery module 200 is not increased, so that the energy density of the battery module 200 is not affected.

As shown in FIG. 11, in some embodiments, along the width direction X of the battery cell, the length of the first folded portion 261 shorter than the long side 242 on both sides of the end cap patch 24 is the third length L3; along the thickness direction Y of the battery cell, the length of the second folded portion 262 exceeds the short side 243 on both sides of the end cap patch 24 is the fourth length L4. After the first folded portion 261 being folded from the long side 242 to the case 23, along the width direction X of the battery cell, at both ends of the side surface of the long side 242 side of the case 23, there are gaps of the third length L3 with no insulating layer adhered, so that the parts with the third length L3 that the second folded portion 262 exceeds the short side 243 are folded in the direction of the first folded portion 261, so that the parts with the fourth length L4 clad the gaps with the third length L3 where no insulating layer is adhered, and clad parts of the second folded portion 262. Specifically, the fourth length L4 should be greater than or equal to the third length L3.

In some embodiments, in a state in which the second insulating layer 26 is unfolded, the length of the first folded portion 261 along the width direction X of the battery cell is 2-4 mm shorter than the length of the long side 242, that is, the range of 2×L3 satisfies 2-4 mm; the length of the second folded portion 262 along the thickness direction Y of the battery cell is 10-20 mm greater than the length of the short side 243, that is, the range of 2×L4 satisfies 10-20 mm, so as to ensured that the second folded portion 262 can be folded to the first folded portion 261 after being folded to the case 23, and clads a part of the first folded portion 261, thereby ensuring complete cladding of the case 23.

Figure 12:
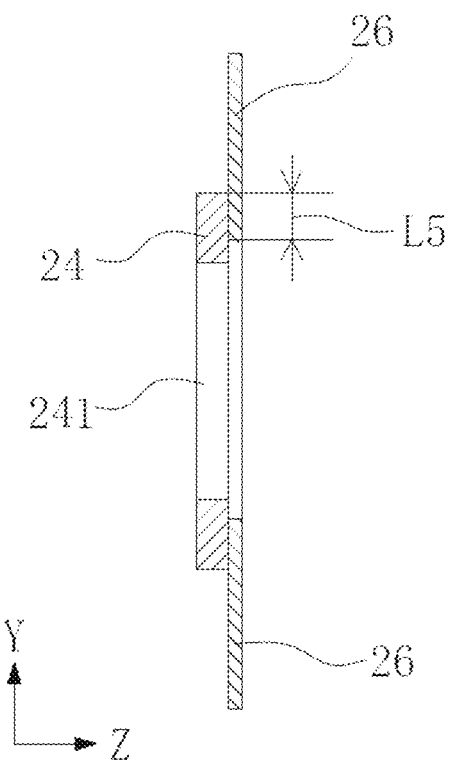
FIG. 12 is a cross-sectional view taken along line A-A in FIG. 8.

FIG. 12 is a cross-sectional view taken along line A-A in FIG. 8.

As shown in FIG. 12, in some embodiments, the second insulating layer 26 is adhered to the edge region of the surface of the end cap patch 24 away from the end cap assembly 21. Since the end cap patch 24 is provided with the terminal hole 241 for accommodating the electrode terminal 211, so that the width of the end cap patch 24 on both sides of the terminal hole 241 along the thickness direction Y of the battery cell is small, and when the second insulating layer 26 is adhered to the end cap patch 24, interference with the terminal hole 241 should be avoided, so as to completely expose the terminal hole 241, thereby not affecting the electrode terminal 211 from penetrating out from the terminal hole 241.

In some embodiments, the width L5 of the edge region where the second insulating layer is adhered to the end cap patch is 3-7 mm, which can ensure that the second insulating layer 26 is firmly adhered to the end cap patch 24 and avoid interference with the terminal hole 241.

Figure 13:
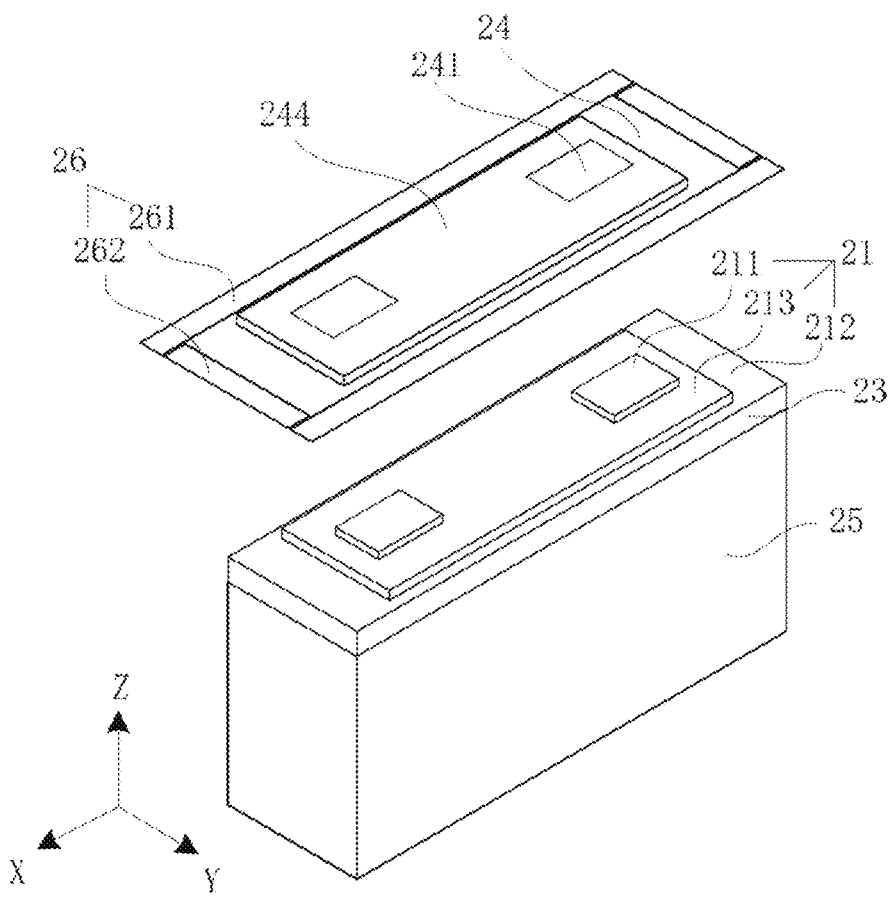
FIG. 13 is a schematic exploded view of a battery cell cladding with an insulating layer according to another embodiment of the present application.
Figure 14:
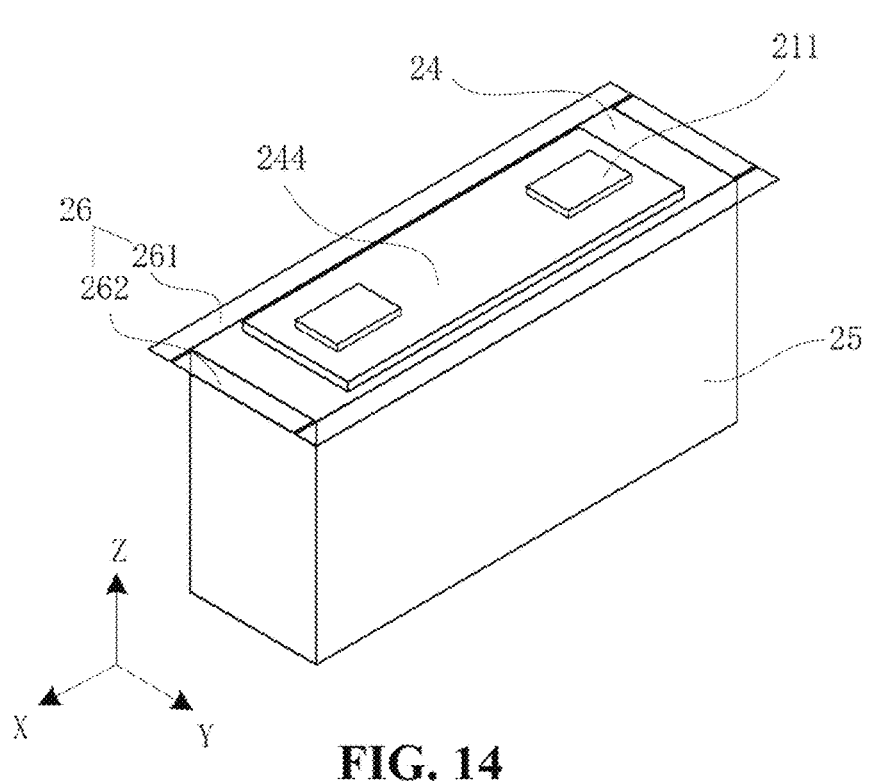
FIG. 14 is a schematic view of the end cap patch of the battery cell in FIG. 13 is adhered to the end cap assembly.
Figure 15:
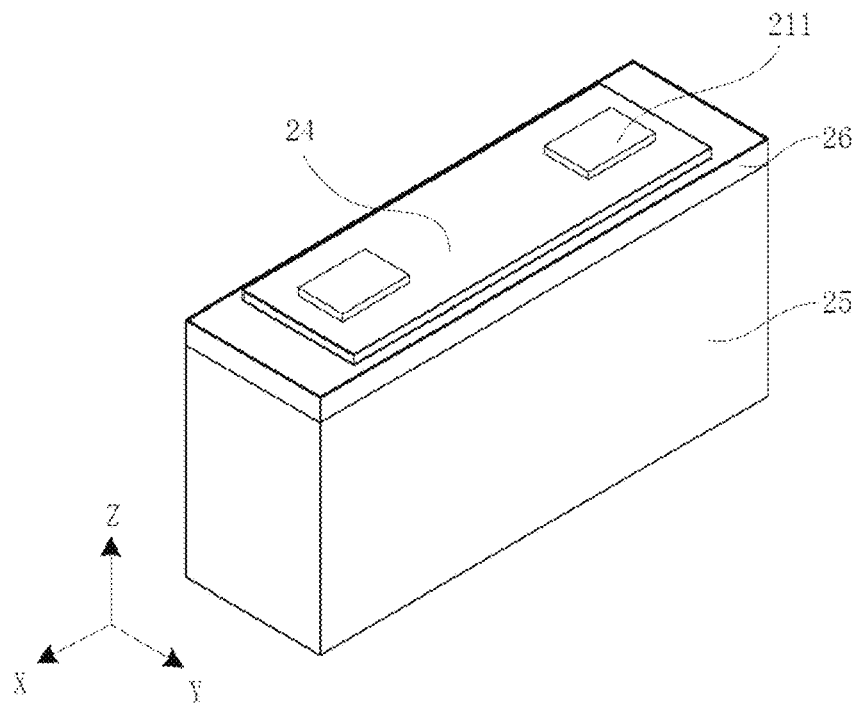
FIG. 15 is a schematic view of the battery cell in FIG. 14 has been clad with an insulating layer.

FIG. 13 is a schematic exploded view of a battery cell 20 cladding with an insulating layer according to another embodiment of the present application; FIG. 14 is a schematic view of the end cap patch 24 of the battery cell 20 in FIG. 13 is adhered to the end cap assembly 21; FIG. 15 is a schematic view of the battery cell 20 in FIG. 14 has been clad with an insulating layer.

FIGS. 13 to 15 show schematic diagrams of a battery cell 20 according to some other embodiments of the present application. These embodiments are the same as the embodiments shown in FIGS. 5 to 7 in that a second insulating film 26 is adhered to the outer peripheral edge region of the end cap patch 24, and the second insulating layer 26 is at least partially folded to the case 23 and is connected with the first insulating layer 25. Likewise, the second insulating layer 26 includes first folded portions 261 located on both sides of the end cap patch 24 along the thickness direction Y of the battery cell and second folded portions 262 located on both sides of the end cap patch 24 along the width direction X of the battery cell. The first folded portions 261 and the second folded portions 262 are respectively folded to the case 23, and no wrinkles appear at the corner angle positions of the case 23, and a flat flanging is formed on the case 23, which improves the effect of insulation protection and does not affect energy density of the battery.

The difference between the embodiments shown in FIGS. 13 to 15 and the embodiments shown in FIGS. 5 to 7 is that the end cap assembly 21 is provided with a convex hull 213 that protrudes in a direction away from the interior of the battery cell 20, the electrode terminals 211 are provided on the convex hull 213. Due to the existence of the convex hull 213, the width of the end cap 212 on both sides of the convex hull 213 along the thickness direction Y of the battery cell is small, resulting in the region where the end cap patch 24 can be adhered with the insulating layer on both sides of the electrode terminals 211 along the thickness direction Y of the battery cell is very small, by using a cladding manner in which the insulating layer is folded from the case 23 to the end cap patch 24, the problem that the flanging is not easy to be flattened and pressed by a flattening apparatus is usually also exists. Therefore, in this embodiment, for the battery cell 20 provided with the convex hull 213 on the end cover assembly 21, the end cover patch 24 thereof is also correspondingly provided with a convex portion 244 which is adapted to the convex hull 213, and the convex portion 244 is also correspondingly provided with the terminal holes 241 corresponding to the electrode terminals 211, and the outer surface of the case 23 away from the interior of the battery cell 20 is clad with a first insulating layer 25; the end cap patch 24 is attached to the surface of the end cap assembly 21 away from the interior of the battery cell 20; wherein the end cap patch 24 is adhered with a second insulating layer 26, the second insulating layer 26 is located in the edge region of the end cap patch 24 avoiding the convex portion 244, and the second insulating layer 26 is at least partially folded to the case 23 and connected with the first insulating layer 25.

In the battery cell 20 of this embodiment, before the end cap patch 24 is attached to the end cap assembly 21, the second insulating layer 26 is first adhered to the end cap patch 24, and the position of the convex portion 244 is avoided, relying on the adhesiveness of the end cap patch 24 and the second insulating layer 26, the two can be firmly adhered. After the end cap patch 24 is attached to the end cap assembly 21, the part of the second insulating layer 26 exceeding the end cap patch 24 and the end cap assembly 21 is folded to the case 23, since the outer surface of the case 23 is a flat and smooth plane, there is no interference from other elements, so that the second insulating layer 26 is connected with the first insulating layer 25 after folded to the case 23, thereby achieving cladding and insulation of the entire outer surface of the battery cell 20, so that the second insulating layer 26 and the first insulating layer 25 are completely adhered to the case 23, the adhesion is firm, and no warping occurs at the folded position, so that the end cap patch 24 is prevented from falling off, thereby reducing the risk of short circuit of the battery cell 20.

Figure 16:
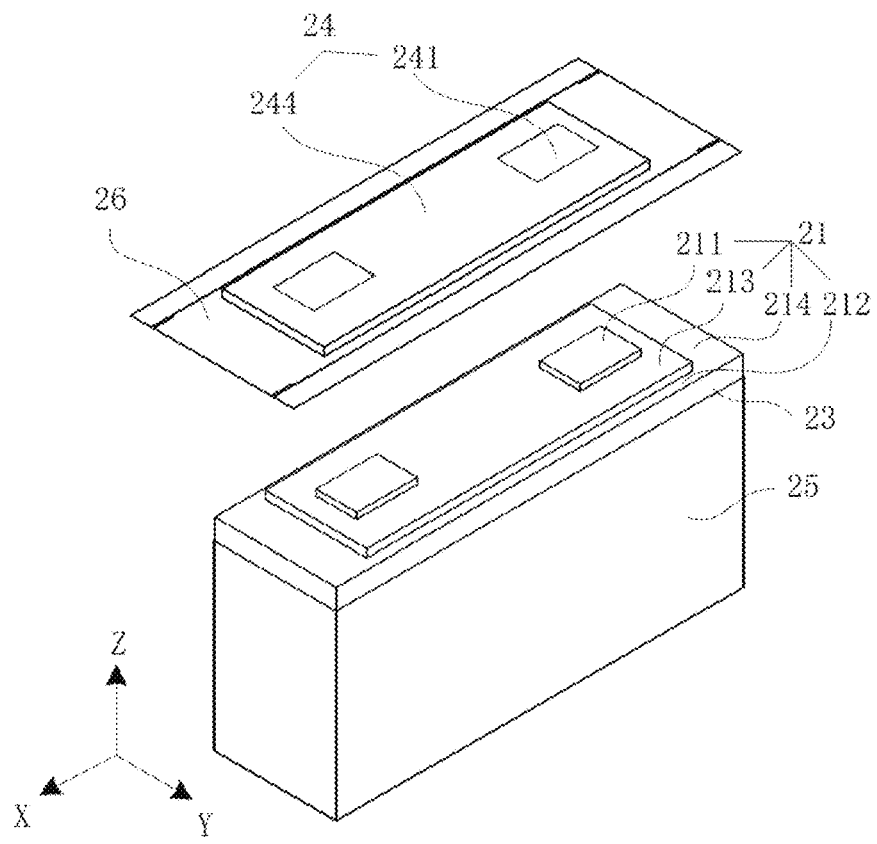
FIG. 16 is a schematic exploded view of a battery cell clad with an insulating layer according to still other embodiments of the present application.

FIG. 16 is a schematic exploded view of a battery cell 20 clad with an insulating layer according to still other embodiments of the present application.

FIG. 16 shows a battery cell 20 of still another embodiment. The battery cell 20 is the same as the battery cell 20 of the embodiment shown in FIGS. 13 to 15 in that the end cap assembly 21 is provided with a convex hull 213 and the end cap patch 24 is provided with a convex portion 244 corresponding to the convex hull 213, the difference lies in that the end cap patch 24 does not cover the entire end cap assembly 21.

Figure 17:
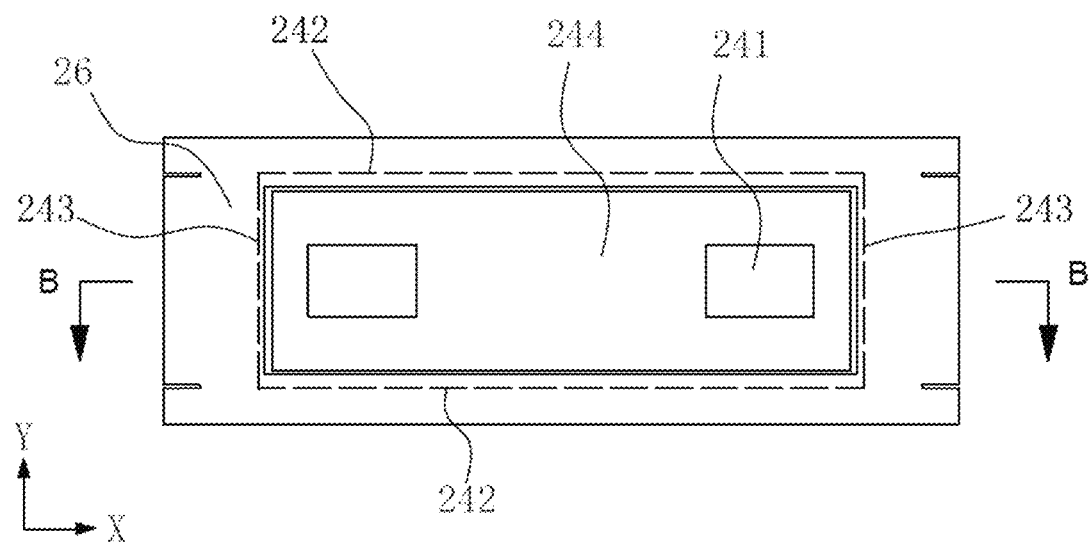
FIG. 17 is a top view of an end cap patch adhered with a second insulating layer according to still other embodiments of the present application.
Figure 18:
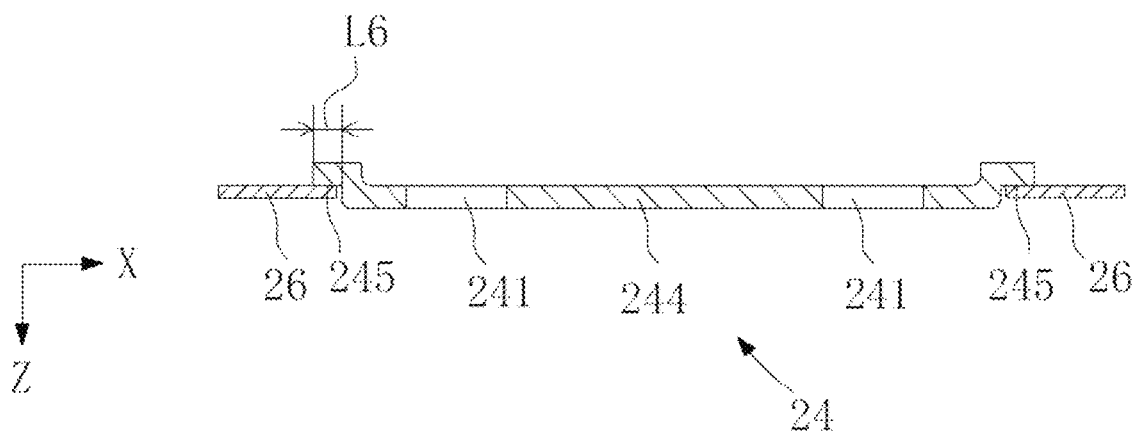
FIG. 18 is a cross-sectional view taken along line B-B in FIG. 17.

FIG. 17 is a top view of an end cap patch 24 adhered with a second insulating layer 26 according to still other embodiments of the present application; FIG. 18 is a cross-sectional view taken along line B-B in FIG. 17.

As shown in FIG. 16 to FIG. 18, in some embodiments, the end cap assembly 21 is provided with a convex hull 213 protruding in a direction away from the interior of the battery cell, and shoulders 214 located on both sides of the convex hull 213 along the width direction X of the battery cell. The end cap patch 24 is provided with a convex portion 244 adapted to the convex hull 214, and an adhesion region 245 located on both sides of the convex portion 244 along the width direction X of the battery cell, the adhesion region 245 is adhered with a second insulating layer 26, so that the second insulating layer 26 covers the shoulders 214.

The convex hull 213 of the end cap assembly 21 is respectively provided with shoulders 214 of a certain width along the width direction X of the battery cell. The battery cell 20 can be provided with a cooling apparatus at the position corresponding to the shoulders 214 for cooling the battery cell 20, so as to ensure the safety of the battery cell 20. In this embodiment, in order to improve the cooling effect of the cooling apparatus at the position of the shoulders 214, the size of the end cap patch 24 along the width direction X of the battery cell is made small, and does not cover the position of the shoulders 214 of the end cap assembly 21. The second insulating layer 26 is adhered to the edge region of the end cap patch 24, and the shoulders 214 are covered by the second insulating layer 26, so as to ensure the insulating effect of the shoulders 214. Since the second insulating layer 26 has a smaller thickness than the end cap patch 21, the cooling effect of the cooling apparatus at the position of the shoulders 214 is enhanced.

The dotted line in FIG. 17 represents the edge position of the end cap patch 24, and the second insulating layer 26 is adhered to the end cap patch 24 to cover the long side 242 and the short side 243 of the end cap patch 24.

As shown in FIG. 18, in order to enable the second insulating layer 26 to cover most of the shoulders 214 of the end cap assembly 21, the width L6 of the adhesion regions 245 located on both sides of the convex portion 244 along the width direction X of the battery cell may be relatively small. In some embodiments, the width L6 of the adhesion region 245 is 3-7 mm, so that the second insulating layer 26 can be firmly adhered to the end cap patch 24, and the second insulating layer 26 can cover a sufficient area of the shoulders 214, so that the cooling effect is enhanced when the position of the shoulders 214 is cooled, thereby improving the safety performance of the battery cell 20.

The battery 2 provided in the embodiments of the present application includes a plurality of battery cells 20 as described above, and the overall insulation performance thereof is good, the risk of short circuit is reduced, and the safety of the battery 2 is improved.

The electrical apparatus provided by the embodiments of the present application, such as vehicle 1, uses battery 2 as described above, and the battery 2 is used to provide electrical energy, which has high safety performance.

The above are only preferred embodiments of the present application, and are not intended to limit the present application. For those skilled in the art, the present application may have various modifications and changes. Any modifications, equivalent replacements, improvements, etc. made within the spirit and principle of the present application shall be included within the scope of protection of the present application.

The invention claimed is:

1. A battery cell, comprising:
    a case, an outer surface thereof away from the interior of the battery cell is clad with a first insulating layer;
    an end cap assembly, which is disposed at an end portion of the case along the length direction of the battery cell; and
    an end cap patch, which is attached to a surface of the end cap assembly away from the interior of the battery cell; wherein
    the end cap patch is adhered with a second insulating layer, and the second insulating layer is at least partially folded to the case and is connected with the first insulating layer, and a thickness of the second insulating layer is smaller than a thickness of the end cap patch,
    the end cap assembly is provided with a convex hull protruding in a direction away from the interior of the battery cell, and shoulders located on both sides of the convex hull along the width direction of the battery cell,
    the end cap patch is provided with a convex portion adapted to the convex hull, and an adhesion region located on both sides of the convex portion along the width direction of the battery cell, and
    the adhesion region is adhered with the second insulating layer, so that the second insulating layer covers the shoulders.

2. The battery cell according to claim 1, wherein, along the length direction of the battery cell, a distance of a predetermined length is reserved between an end portion of the first insulating layer close to the end cap assembly and an end portion of the case close to the end cap assembly, and the length of the second insulating layer folded to the case is greater than or equal to the predetermined length, so that the second insulating layer is connected with the first insulating layer.

3. The battery cell according to claim 1, wherein
    the case is a square case,
    the end cap assembly and the end cap patch are of square structures adapted to the shape of the end portion of the case along the length direction of the battery cell,
    the second insulating layer is provided with cutouts, and the cutouts extend from the diagonal vertices of the end cap patch to the end portion where the second insulating layer is folded to the case, so that the second insulating layer forms first folded portions located on both sides of the end cap patch along the thickness direction of the battery cell and second folded portions located on both sides of the end cap patch along the width direction of the battery cell.

4. The battery cell according to claim 3, wherein the end cap patch is of a rectangular structure, the first folded portions are folded from the long side of the end cap patch to the case, and the second folded portions are folded from the short side of the end cap patch to the case.

5. The battery cell according to claim 3, wherein in a state in which the second insulating layer is unfolded, the length of the first folded portion along the width direction of the battery cell is greater than the length of the long side of the end cap patch, and the length of the second folded portion along the thickness direction of the battery cell is smaller than the length of the short side of the end cap patch, so that the first folded portion is capable of being folded to the second folded portion after being folded to the case, thereby cladding a part of the second folded portion.

6. The battery cell according to claim 3, wherein in a state in which the second insulating layer is unfolded, the length of the first folded portion along the width direction of the battery cell is smaller than the length of the long side of the end cap patch, and the length of the second folded portion along the thickness direction of the battery cell is greater than the length of the short side of the end cap patch, so that the second folded portion is capable of being folded to the first folded portion after being folded to the case, thereby cladding a part of the first folded portion.

7. The battery cell according to claim 1, wherein the second insulating layer is adhered to an edge region of the surface of the end cap patch away from the end cap assembly.

8. The battery cell according to claim 1, wherein the width of the adhesion region is 3-7 mm.

9. A battery, comprising a plurality of battery cells according to claim 1.

10. An electrical apparatus, comprising the battery according to claim 9, wherein the battery is used for providing electrical energy.

* * * * *